United States Patent
van der Schaar et al.

(10) Patent No.: US 6,788,740 B1
(45) Date of Patent: Sep. 7, 2004

(54) SYSTEM AND METHOD FOR ENCODING AND DECODING ENHANCEMENT LAYER DATA USING BASE LAYER QUANTIZATION DATA

(75) Inventors: Mihaela van der Schaar, Ossining, NY (US); Yingwei Chen, Ossining, NY (US); Hayder Radha, Mahwah, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/411,464

(22) Filed: Oct. 1, 1999

(51) Int. Cl.[7] .................................................. H04B 1/66
(52) U.S. Cl. ............... 375/240; 375/240.1; 375/240.11; 375/240.12; 375/240.03; 375/240.18; 375/240.25; 348/397; 348/398; 348/408; 382/234; 382/238; 382/240
(58) Field of Search ............................ 375/240, 240.25, 375/240.26, 240.27, 240.1, 240.2, 240.12, 240.18, 240.03, 240.11; 370/468; 348/397, 398, 408; 382/234, 259, 240, 238

(56) References Cited

U.S. PATENT DOCUMENTS

| | | | |
|---|---|---|---|
| 5,349,383 A | * 9/1994 | Parke et al. | 375/240.1 |
| 5,414,469 A | * 5/1995 | Gonzales et al. | 375/240.18 |
| 5,528,299 A | * 6/1996 | Dufour et al. | 375/240.13 |
| 5,986,708 A | * 11/1999 | Katata et al. | 375/240.1 |
| 6,263,022 B1 | * 7/2001 | Chen et al. | 375/240.03 |
| 6,275,531 B1 | * 8/2001 | Li | 375/240.12 |
| 6,480,547 B1 | * 11/2002 | Chen et al. | 375/240.27 |

FOREIGN PATENT DOCUMENTS

| | | | |
|---|---|---|---|
| EP | 0469855 A2 | 2/1992 | |
| EP | 0833521 A2 | 4/1998 | |
| WO | 9800977 A1 | 1/1998 | |
| WO | WO0005898 | 2/2000 | ............ H04N/7/30 |

OTHER PUBLICATIONS

Weiping Li: "Scalable video coding with fine granularity scalability" 1999 Digest of Technical Papers. International Conference on Consumer Electronics (Cat. No. 99CH32677), 1999 Digest of Technical Papers. International Conference on Consumer Electronics, Los Angeles, CA, USA, Jun. 22–24, 1999, pp. 306–307, XP000965742 1999, Piscataway, NJ, USA, IEEE, USA ISBN: 0–7803–5123–1 section II.

PHA 23,725, U.S. Ser. No. 09/347,881, filed: Jul. 6, 1999.

PHA 23,726, U.S. Ser. No. 09/347,882, filed: Jul. 6, 1999.

* cited by examiner

*Primary Examiner*—Shawn S. An (57) ABSTRACT

There is disclosed a video encoder comprising a base layer encoder and an enhancement layer encoder. The base layer encoder receives an input stream of video frames and generates compressed base layer video data suitable for transmission to a streaming video receiver. The enhancement layer encoder receives the input stream of video frames and a decoded version of the compressed base layer video data and generates enhancement layer video data associated with the compressed base layer video data and suitable for transmission to the streaming video receiver. The video encoder also comprises a controller associated with the enhancement layer circuitry for receiving a quantization parameter associated with the base layer video data and determining therefrom at least one all-zero bit plane associated with at least one block of the enhancement layer video data. The controller is capable of causing the enhancement layer circuitry not to transmit the at least one all-zero bit plane to the streaming video receiver.

20 Claims, 5 Drawing Sheets

SYSTEM AND METHOD FOR ENCODING AND DECODING ENHANCEMENT LAYER DATA USING BASE LAYER QUANTIZATION DATA

CROSS-REFERENCE TO RELATED APPLICATIONS

The present invention is related to those disclosed in U.S. Patent Application No. Ser. No. 09/347,882, entitled "SYSTEM AND METHOD FOR FINE GRANULAR SCALABLE VIDEO WITH SELECTIVE QUALITY ENHANCEMENT," and in U.S. Patent Application No. Ser. No. 09/347,881, entitled "SYSTEM AND METHOD FOR IMPROVED FINE GRANULAR SCALABLE VIDEO USING BASE LAYER CODING INFORMATION." The foregoing applications were filed on Jul. 6, 1999 and are commonly assigned to the assignee of the present invention. The disclosures of the related patent applications are incorporated herein by reference for all purposes as if fully set forth herein.

TECHNICAL FIELD OF THE INVENTION

The present invention is directed, in general, to video encoding systems and, more specifically, to an encoding system and a decoding system for streaming video data.

BACKGROUND OF THE INVENTION

Real-time streaming of multimedia content over data networks, including the Internet, has become an increasingly common application in recent years. A wide range of interactive and non-interactive multimedia applications, such as news-on-demand, live network television viewing, video conferencing, among others, rely on end-to-end streaming video techniques. Unlike a "downloaded" video file, which may be retrieved first in "non-real" time and viewed or played back later in "real" time, streaming video applications require a video transmitter that encodes and transmits a video signal over a data network to a video receiver, which must decode and display the video signal in real time.

Scalable video coding is a desirable feature for many multimedia applications and services that are used in systems employing decoders with a wide range of processing power. Scalability allows processors with low computational power to decode only a subset of the scalable video stream. Another use of scalable video is in environments with a variable transmission bandwidth. In those environments, receivers with low-access bandwidth receive, and consequently decode, only a subset of the scalable video stream, where the amount of that subset is proportional to the available bandwidth.

Several video scalability approaches have been adopted by lead video compression standards such as MPEG-2 and MPEG-4. Temporal, spatial and quality (e.g., signal-noise ratio (SNR)) scalability types have been defined in these standards. All of these approaches consist of a base layer (BL) and an enhancement layer (EL). The base layer part of the scalable video stream represents, in general, the minimum amount of data needed for decoding that stream. The enhanced layer part of the stream represents additional information, and therefore enhances the video signal representation when decoded by the receiver.

For example, in a variable bandwidth system, such as the Internet, the base layer transmission rate may be established at the minimum guaranteed transmission rate of the variable bandwidth system. Hence, if a subscriber has a minimum guaranteed bandwidth of 256 kbps, the base layer rate may be established at 256 kbps also. If the actual available bandwidth is 384 kbps, the extra 128 kbps of bandwidth may be used by the enhancement layer to improve on the basic signal transmitted at the base layer rate.

For each type of video scalability, a certain scalability structure is identified. The scalability structure defines the relationship among the pictures of the base layer and the pictures of the enhanced layer. One class of scalability is fine-granular scalability. Images coded with this type of scalability can be decoded progressively. In other words, the decoder may decode and display the image with only a subset of the data used for coding that image. As more data is received, the quality of the decoded image is progressively enhanced until the complete information is received, decoded, and displayed.

The proposed MPEG-4 standard is directed to video streaming applications based on very low bit rate coding, such as video-phone, mobile multimedia/audio-visual communications, multimedia e-mail, remote sensing, interactive games, and the like. Within the MPEG-4 standard, fine-granular scalability (FGS) has been recognized as an essential technique for networked video distribution. FGS primarily targets applications where video is streamed over heterogeneous networks in real-time. It provides bandwidth adaptivity by encoding content once for a range of bit rates, and enabling the video transmission server to change the transmission rate dynamically without in-depth knowledge or parsing of the video bit stream.

An important priority within conventional FGS techniques is improving coding efficiency and visual quality of the intra-frame coded enhancement layer. This is necessary to justify the adoption of FGS techniques for the compression of the enhancement layer in place of non-scalable (e.g., single layer) or less granular (e.g., multi-level SNR scalability) coding methods.

Many video coding techniques have been proposed for the FGS compression of the enhancement layer, including wavelets, bit-plane DCT and matching pursuits. At the MPEG-4 meeting in Seoul, Korea in March 1999, the bit-plane DCT solution proposed by Optivision was selected as a reference. The bit-plane coding scheme adopted as reference for FGS includes the following steps at the encoder side:

1. residual computation in the DCT domain, by subtracting from each original DCT coefficient the reconstructed DCT coefficient after base-layer quantization and dequantization;

2. determining the maximum value of all of the absolute values of the residual signal in a video object plane (VOP) and the maximum number of bits n to represent this maximum value;

3. for each block within the VOP, representing each absolute value of the residual signal with n bits in the binary format and forming n bit-planes;

4. bit-plane encoding of the residual signal absolute values; and 5. sign encoding of the DCT coefficients which are quantized to zero in the base-layer.

These coding steps are reversed at the decoder side. It is important to notice that the current implementation of the bit-plane coding of DCT coefficients is done independently of the base-layer (coding) information. The quantized base-layer DCT coefficients, which are employed for the residual layer computation in the DCT domain, are the only information of the base-layer that is re-used for the compression of the enhancement layer. However, additional base-layer information that could be used to further compress the enhancement layer data is unused.

There is therefore a need in the art for improved encoders and encoding techniques for use in streaming video systems. In particular, there is a need for encoders and decoders that use base-layer information to increase the efficiency of the encoding and decoding of enhancement layer data. More particularly, there is a need for encoding techniques that use base-layer information to eliminate as much redundant information as possible from the enhancement layer data. There is a further need for decoding techniques that are able to use the base-layer information to predict as much enhancement layer data as possible.

SUMMARY OF THE INVENTION

To address the above-discussed deficiencies of the prior art, it is a primary object of the present invention to provide a new technique for improving the coding efficiency of an enhancement layer compression scheme. The present invention proposes a technique for enhancing the coding efficiency of the bit-plane compression scheme of, for example, the residual DCT coefficients currently adopted as a reference within the MPEG-4 standard. However, it is important to realize that the proposed improvements are not limited to the DCT transform. Those skilled in the art will readily understand that the principles of the present invention may also be successfully, applied to other transforms (e.g., wavelets) for the compression of the base and enhancement layer. However, in the descriptions that follow, DCT coefficients are employed for illustration purposes only.

The proposed algorithm employs base-layer quantization parameters to predict a range of the residual DCT coefficients (i.e., a maximum number of significant bit-planes for each residual coefficient) and to avoid the unnecessary transmission of certain zero-valued bit-planes of the DCT coefficients.

While the adopted FGS scheme eliminates most of the temporal dependencies between consecutive enhancement-layer frames by adopting a motion-compensation prediction-based scheme at the base-layer, unexploited redundancies still remain at the enhancement-layer level. Using base-layer coding information, certain characteristics of the enhancement-layer (residual) DCT coefficients can be predicted, thereby improving coding efficiency.

Accordingly, in an advantageous embodiment of the present invention, there is provided a video encoder comprising: 1) base layer circuitry capable of receiving an input stream of video frames and generating therefrom compressed base layer video data suitable for transmission to a streaming video receiver; 2) enhancement layer circuitry capable of receiving the input stream of video frames and a decoded version of the compressed base layer video data and generating therefrom enhancement layer video data associated with the compressed base layer video data and suitable for transmission to the streaming video receiver; and 3) a controller associated with the enhancement layer circuitry capable of receiving a quantization parameter associated with the base layer video data and determining therefrom at least one all-zero bit plane associated with at least one block of the enhancement layer video data, wherein the controller is capable of causing the enhancement layer circuitry not to transmit the at least one all-zero bit plane to the streaming video receiver.

According to one embodiment of the present invention, the quantization parameter is associated with a frame of the base layer video data.

According to another embodiment of the present invention, the controller determines an upper boundary of a quantization parameter associated with the at least one block.

According to still another embodiment of the present invention, the controller is further capable of receiving a weighting matrix associated with the base-layer video data and determining the at least one all-zero bit plane as a function of the quantization parameter and the weighting matrix.

According to yet another embodiment of the present invention, the controller is capable of determining a second all-zero bit plane associated with the at least one block of the enhancement layer video data, based on an upper bound of the at least one block and a value of at least one previously transmitted bit plane associated with the at least one block, wherein the controller is capable of causing the enhancement layer circuitry not to transmit the second all-zero bit plane to the streaming video receiver.

The present invention also may be embodied in a decoder. According to an advantageous embodiment of the present invention, there is provided a video decoder comprising: 1) base layer circuitry capable of receiving compressed base layer video data; 2) enhancement layer circuitry capable of receiving enhancement layer video data associated with the compressed base layer video data; and 3) a controller associated with the enhancement layer circuitry capable of receiving a quantization parameter associated with the compressed base layer video data and predicting therefrom at least one all-zero bit plane associated with at least one block of the enhancement layer video data, wherein the controller is capable of inserting the at least one all-zero bit plane into the enhancement layer video data.

According to one embodiment of the present invention, the quantization parameter is associated with a frame of the base layer video data.

According to another embodiment of the present invention, the controller determines an upper boundary of a quantization parameter associated with the at least one block.

According to yet another embodiment of the present invention, the controller is further capable of receiving a weighting matrix associated with the base-layer video data and determining the at least one all-zero bit plane as a function of the quantization parameter and the weighting matrix.

According to still another embodiment of the present invention, the controller is capable of determining a second all-zero bit plane associated with the at least one block of the enhancement layer video data, based on an upper bound of the at least one block and a value of at least one previously received bit plane associated with the at least one block, wherein the controller is capable of inserting the second all-zero bit plane into the enhancement layer video data.

The foregoing has outlined rather broadly the features and technical advantages of the present invention so that those skilled in the art may better understand THE DETAILED DESCRIPTION OF THE INVENTION that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged video encoder and video decoder.

Figure 1:
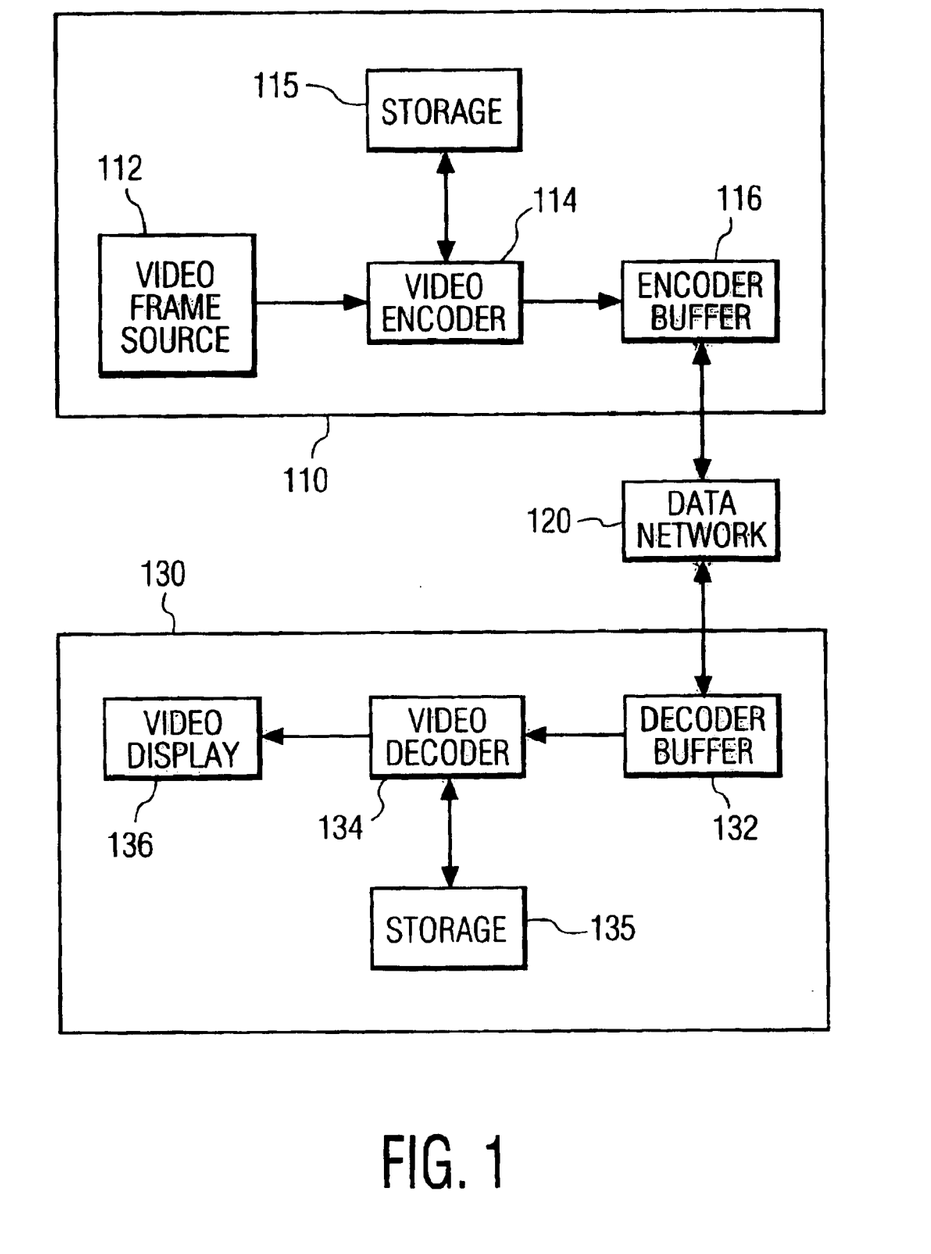
FIG. 1 illustrates an end-to-end transmission of streaming video from a streaming video transmitter through a data network to a streaming video receiver, according to one embodiment of the present invention.

FIG. 1 illustrates an end-to-end transmission of streaming video from streaming video transmitter 110 through data network 120 to streaming video receiver 130, according to one embodiment of the present invention. Depending on the application, streaming video transmitter 110 may be any one of a wide variety of sources of video frames, including a data network server, a television station transmitter, a cable network, a desktop personal computer (PC), or the like.

Streaming video transmitter 110 comprises video frame source 112, video encoder 114, storage 115, and encoder buffer 116. Video frame source 112 may be any device capable of generating a sequence of uncompressed video frames, including a television antenna and receiver unit, a video cassette player, a video-camera, a disk storage device capable of storing a "raw" video clip, and the like. The uncompressed video frames enter video encoder 114 at a given, picture rate (or "streaming rate") and are compressed according to any known compression algorithm or device, such as an MPEG-4 encoder. Video encoder 114 then transmits the compressed video frames to encoder buffer 116 for buffering in preparation for transmission across data network 120. Data network 120 may be any suitable network and may include portions of both public data networks, such as the Internet, and private data networks, such as an enterprise-owned local area network (LAN) or wide area network (WAN).

Streaming video receiver 130 comprises decoder buffer 132, video decoder 134, storage 135, and video display 136. Depending on the application, streaming video receiver may be any one of a number of a wide variety of receivers of video frames, including a television receiver, a desktop personal computer (PC), a video cassette recorder (VCR), or the like. Decoder buffer 132 receives and stores streaming compressed video frames from data network 120. Decoder buffer 132 then transmits the compressed video frames to video decoder 134 as required. Video decoder 134 decompresses the video frames at the same rate (ideally) at which the video frames were compressed by video encoder 114. Video decoder 134 sends the decompressed frames to video display 136 for play-back on the screen of video display 134.

In an advantageous embodiment of the present invention, video encoder 114 may be implemented as a software program executed by a conventional data processor, such as a standard MPEG encoder. In such an implementation, video encoder 114 may comprise a plurality of computer executable instructions stored in storage 115. Storage 115 may comprise any type of computer storage medium, including a fixed magnetic disk, a removable magnetic disk, a CD-ROM, magnetic tape, video disk, and the like. Furthermore, in an advantageous embodiment of the present invention, video decoder 134 also may be implemented as a software program executed by a conventional data processor, such as a standard MPEG decoder. In such an implementation, video decoder 134 may comprise a plurality of computer executable instructions stored in storage 135. Storage 135 also may comprise any type of computer storage medium, including a fixed magnetic disk, a removable magnetic disk, a CD-ROM, magnetic tape, video disk, and the like.

Figure 2:
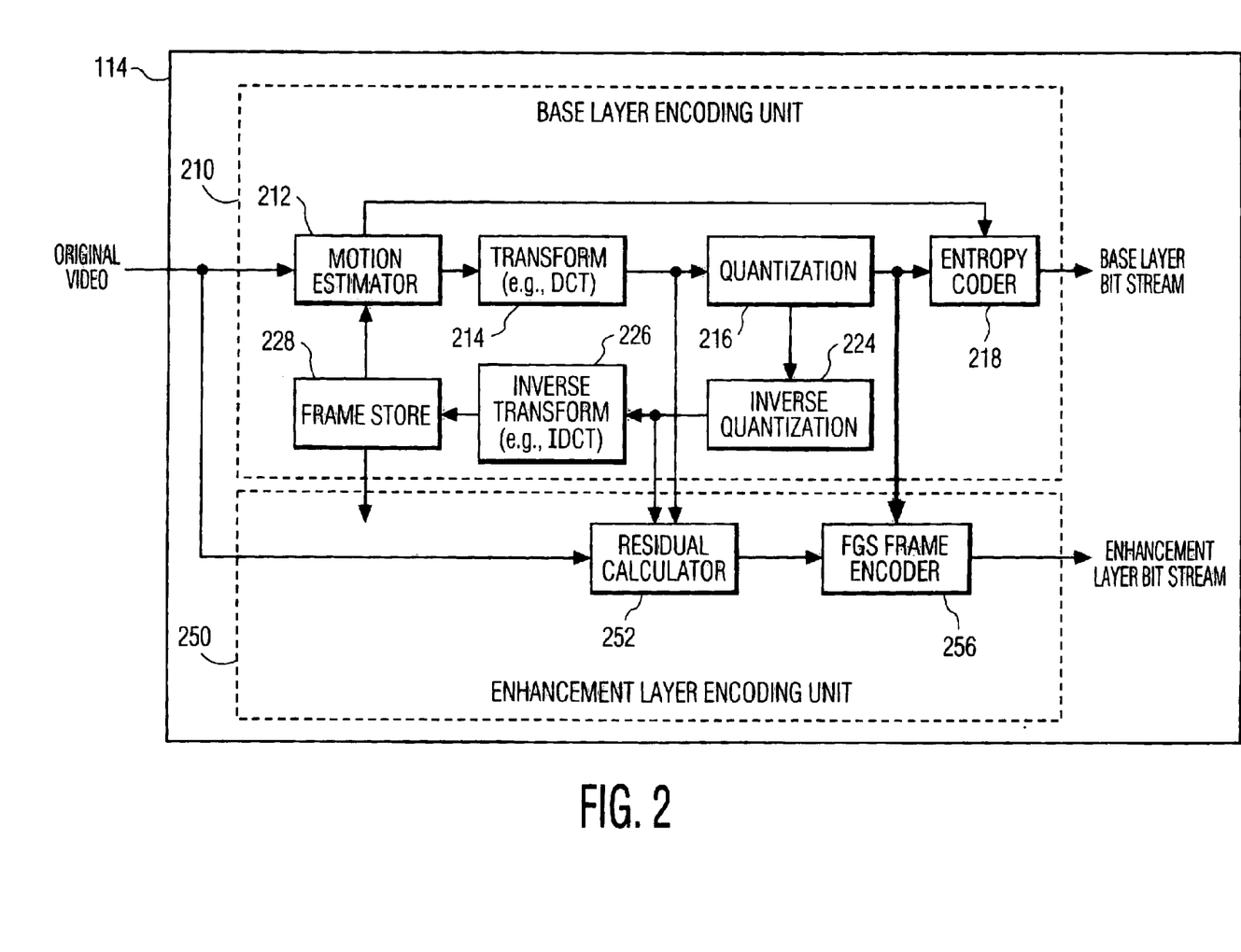
FIG. 2 illustrates an exemplary video encoder in accordance with one embodiment of the present invention.

FIG. 2 illustrates exemplary video encoder 114 in accordance with one embodiment of the present invention. Video encoder 114 comprises base layer encoding unit 210 and enhancement layer encoding unit 250. Video encoder 114 receives an original video signal that is transferred to base layer encoding unit 210 for generation of a base layer bit stream. Base layer encoding unit 210 contains a main processing branch, comprising motion estimator 212, transform circuit 214, quantization circuit 216, and entropy coder 218 that generates the base layer bit stream. Base layer encoding unit 210 also contains a feedback branch comprising inverse quantization circuit 224, inverse transform circuit 226, and frame store circuit 228.

Motion estimator 212 compares the original video signal input with the received output from frame store 228 to estimate the amount of motion between the present video frame and the reference frame as represented by changes in pixel characteristics. The amount of motion or change is also known as the residue. The MPEG standard specifies that motion information may be represented by one to four spatial motion vectors per 16×16 sub-block (or macro-block) of a frame.

Transform circuit 214 receives the resultant motion or residue estimate output from motion estimator 212 and transforms it from a spatial domain to a frequency domain using known de-correlation techniques, such as a discrete cosine transform (DCT). In the case of DCT, motion information is typically based on 16×16 macro-blocks. The motion information associated with each group of 16×16 macro-blocks in the present original video is coded differentially with respect to the motion information in the previous adjacent block from frame store 228. Thus, transform circuit 214 provides a motion compensated residue output coefficient represented as coeff(i) for each sample block or area of a particular video object plane (VOP), where $0 \leq i < 64$ for an 8×8 DCT. During the decode process, coeff(i) may serve as a predictor of whether a particular segment of the present original video frame has no all-zero bit planes (all-zero planes) or one or more all-zero planes. The transform circuit 214 output is connected to quantization circuit 216 and to the enhancement layer encoding unit 250.

Quantization circuit 216 receives the frequency domain outputs (DCT coefficient outputs coeff(i)) from transform circuit 214 and further compresses the motion compensation prediction information. Quantization circuit 216 quantisizes each coeff(i) with a quantization parameter step-size (QP) to produce a quantization value coefficient (qcoeff(i)) as its output. To illustrate the relationships between qcoeff(i), coeff(i), and QP, consider the quantization of the transformed coefficients at the base-layer for the non-intra case (i.e., B- and P-macroblocks). For the intra-blocks, a similar relationship can be determined.

The non-intra-blocks relationship between qcoeff(i), coeff (i), and QP, is provided by the following equation:

$$q\text{coeff}[i] = \#\{ABS((ABS(\text{coeff}[i]) - QP/2)/(2QP))\}\#$$

where QP for this case employs the H263 quantization type, ABS represents the absolute value and #(a)# equals the closest integer value smaller than "a" (i.e., $n \leq a < (n+1)$, where a is a real-number and n an integer.

Quantization circuit 216 provides inputs for the base layer feedback path, entropy coder 218, and enhancement layer encoding unit. Depending upon the application and video quality, quantization circuit 216 may also use a weighting factor to adjust quantization of the transform output.

The feedback path of the base layer encoding unit begins with inverse quantization circuit 224. Inverse quantization circuit 224 de-quantizes the output of quantization circuit 216 to produce a signal (dqcoeff(i)) that is representative of the transform input to quantization circuit 216. For DCT intra-blocks and prior QP, the relationships between dqcoeff (i), qcoeff(i), coeff(i), and QP are shown below:

$$
\begin{aligned}
\text{dqcoeff}(i) &= \text{qcoeff}(i) \text{ after de-quantization} \\
&= (2QP)(\text{qcoeff}(i)) \\
&= (2QP) \# \{ABS((ABS(\text{coeff}[i]) - QP/2)/(2QP))\} \# \\
&> (2QP) ABS(\text{coeff}(i) - (2QP-1) - QP/2)/(2QP) \\
&> ABS(\text{coeff}(i) - 2.5QP + 1)
\end{aligned}
$$

Inverse transform circuit 226 converts the output of inverse quantization circuit 224 to produce a signal which provides a representation of the original video signal as modified by the transform and quantization processes. Frame store circuit 228 receives the decoded representative frame from inverse transform circuit 226 and stores the frame as a reference signal for output to motion estimator circuit 212. As previously discussed, motion estimator circuit 212 uses the resultant stored frame signal as the comparison signal for determining differences between the stored frame and the present original video signal.

Entropy coder circuit 218 receives quantized coefficients from quantization circuit 216 and the motion estimator 212 output and further compresses the data using variable length coding techniques that represent areas with a high probability of occurrence with a relatively short code and areas of lower probability of occurrence with a relatively long code. The output of entropy coder 218 forms the base layer bit stream for transfer to encoder buffer 116 as shown by FIG. 1.

Enhancement layer encoding unit 250 contains a main processing branch, comprising residual calculator 252 and fine granular scalability (FGS) encoder 256. Residual calculator circuit 252 compares the original video signal with the frames stored in frame store 228 to generate a residual signal based on the difference between the two input signals. Residual calculator also receives coefficient data from the output of transform circuit 214 (coeff(i)) and coefficient data from the output of inverse quantization circuit 224 (dqcoeff (i)) to produce a residual output signal representing image information (DCT coefficients, for example) which is missing in the base layer frames as a result of the transform, quantization, and de-quantization processes. The output of residual calculator circuit 252 may also be referred to as residual data or residual error data. The following equations show the relationships of the calculated residual, quantization parameter, image coefficients, quantized coefficients, and de-quantized coefficients for DCT and QP H263.

$$
\begin{aligned}
\text{res}(i) &= \text{residual between coeff}(i) \text{ and dqcoeff}(i). \\
\text{res}(i) &= \text{coeff}(i) - \text{dqcoeff}(i) \\
&= \text{coeff}(i) - (2QP) \#\{ABS((ABS(\text{coeff}(i)) - QP/2)/(2QP))\}\# \\
&< \text{coeff}(i) - (2QP)(\text{coeff}(i) - (2QP-1) - QP/2)/(2QP) \\
&< 2QP - 1 + QP/2 \\
&< 2.5QP - 1
\end{aligned}
$$

FGS frame encoder circuit 256 receives the residual signal from residual calculator 252 and receives quantization parameter (QP) information from quantization circuit 216. FGS frame encoder 256 combines, encodes, and compresses the received signals (DCT coefficients) to produce the compressed output for the enhancement layer bit stream. FGS frame encoder 256 receives the QP data associated with the base layer video data and determines therefrom one of more all-zero bit planes associated with one or more blocks of the enhancement layer video data. FGS frame encoder 256 suppresses transmission of the all-zero bit plane(s) to the streaming video receiver in order to conserve available bandwidth. The all-zero bit planes are redundant information that can be calculated in video decoder 134 using the QP data associated with the base layer video stream, as described below in greater detail. Encoder buffer 116 accepts the enhancement layer bit stream from video encoder 114 and transfers the data to streaming video receiver 130 through data network 120 for decoding by exemplary video decoder 134.

Figure 3:
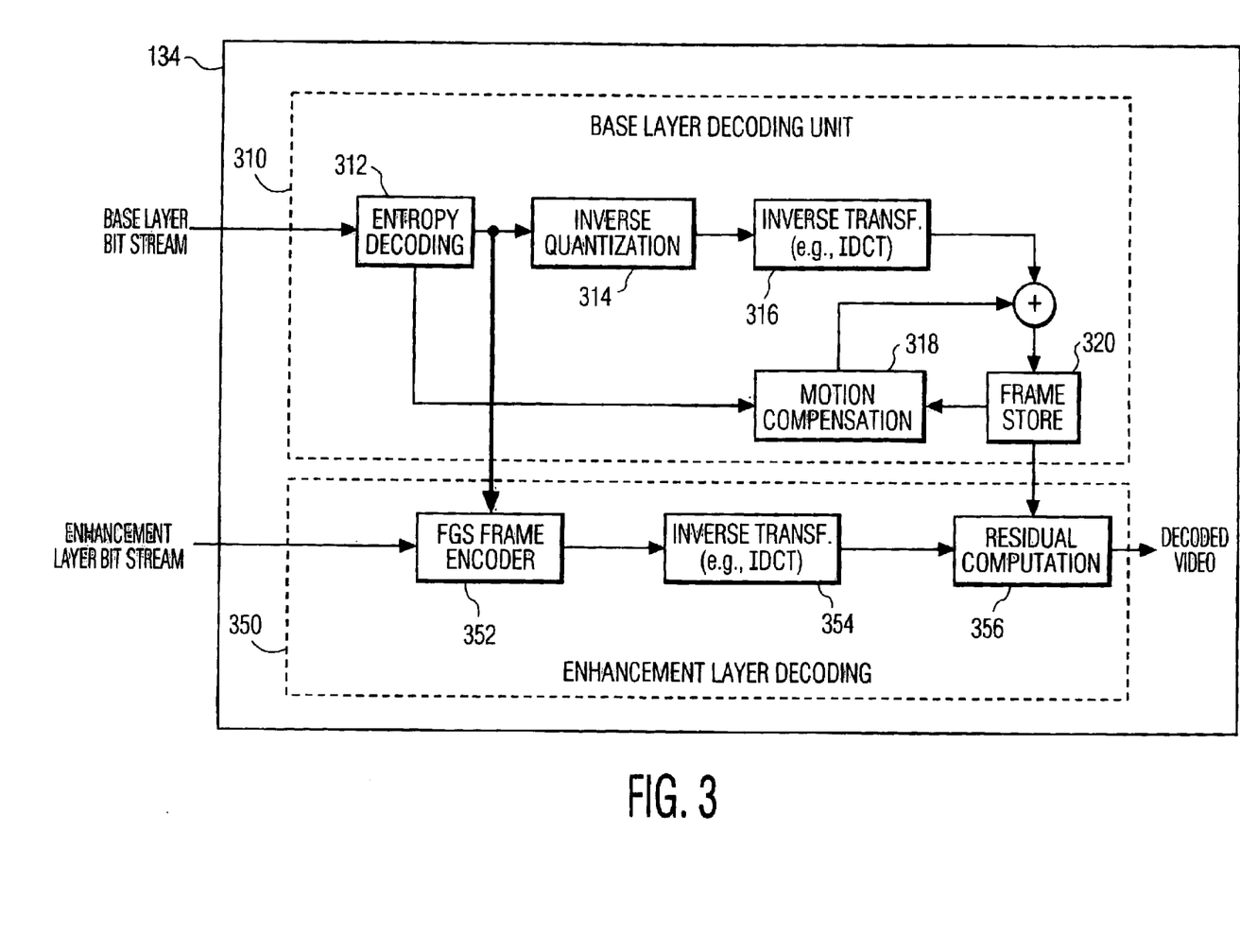
FIG. 3 illustrates an exemplary video decoder in accordance with one embodiment of the present invention.

FIG. 3 illustrates exemplary video decoder 134 in accordance with one embodiment of the present invention. Exemplary video decoder 134 comprises base layer decoding unit 310 and enhancement layer decoding unit 350. Base layer decoding unit 310 comprises a main decode processing path consisting of entropy decoding circuit 312, inverse quantization circuit 314, and inverse transform (e.g., inverse DCT) circuit 316 and a feedback path comprising motion compensation circuit 318 and frame store circuit 320.

Entropy decoding unit 312 receives the base layer bit stream and reverses the entropy coding process from the base layer in video encoder 114 to produce a quantized data signal similar to the output of quantization circuit 216 in base layer encoding unit 210. The quantized signal at the output of entropy decoding circuit 312 contains information such as motion information, quantization step size (i.e., QP data), and type of macro-block. Entropy decoding unit 312 transfers this data selectively to motion compensation circuit 318, inverse quantization circuit 314, and enhancement layer decoding unit 350.

Inverse quantization circuit 314 accepts the decoded quantized (de-quantized) output of entropy decoding circuit 312 and performs an inverse quantization to produce a partially de-compressed signal equivalent to the transform coefficient output (coeff(i)) of transform circuit 214. Inverse transform circuit 316 receives the output signal from inverse quantization circuit 314 and performs an inverse transform, such as an inverse discrete cosine transform (IDCT). The inverse transform produces an output signal representing the decompressed motion signal for the original video input signal to exemplary video encoder 114. The output of inverse transform circuit 316 and the output of motion compensation circuit 318 are combined in frame store circuit 320 to create a decoded base layer video frame. Frame store circuit 320 stores the base layer video frame for transfer to enhancement layer decoding unit 350 and for use by motion compensation circuit 318. Motion compensation circuit 318 re-combines the present decoded motion output from entropy decoding circuit 312 with the decoded base layer video frame from frame store circuit 320 to generate a base layer video frame output for use by the enhancement layer decoding unit 350.

Enhancement layer decoding unit 350 comprises FGS frame decoding unit 352, inverse transform circuit (IDCT) 354, and residual computation circuit 356. FGS frame decoding circuit 352 accepts the enhancement layer bit stream input from decoder buffer 132 and the QP data from entropy decoding circuit 312 and generates an output representing the transformed (DCT) coefficients for the enhancement layer. FGS frame decoding circuit 352 uses the QP data from entropy decoding circuit 312 to identify and re-insert all-zero bit planes that were deleted from the enhancement layer bitstream by video encoder 114. Inverse transform circuit 354 then performs an inverse transform, such as an IDCT, on the output of FGS frame decoding circuit 352 to generate an output signal representing the enhancement layer video frames. Residual computation circuit 356 combines the outputs of inverse transform 354 and frame store 320 to generate a decoded version of the original video signal as an input to video display 136.

Figure 4:
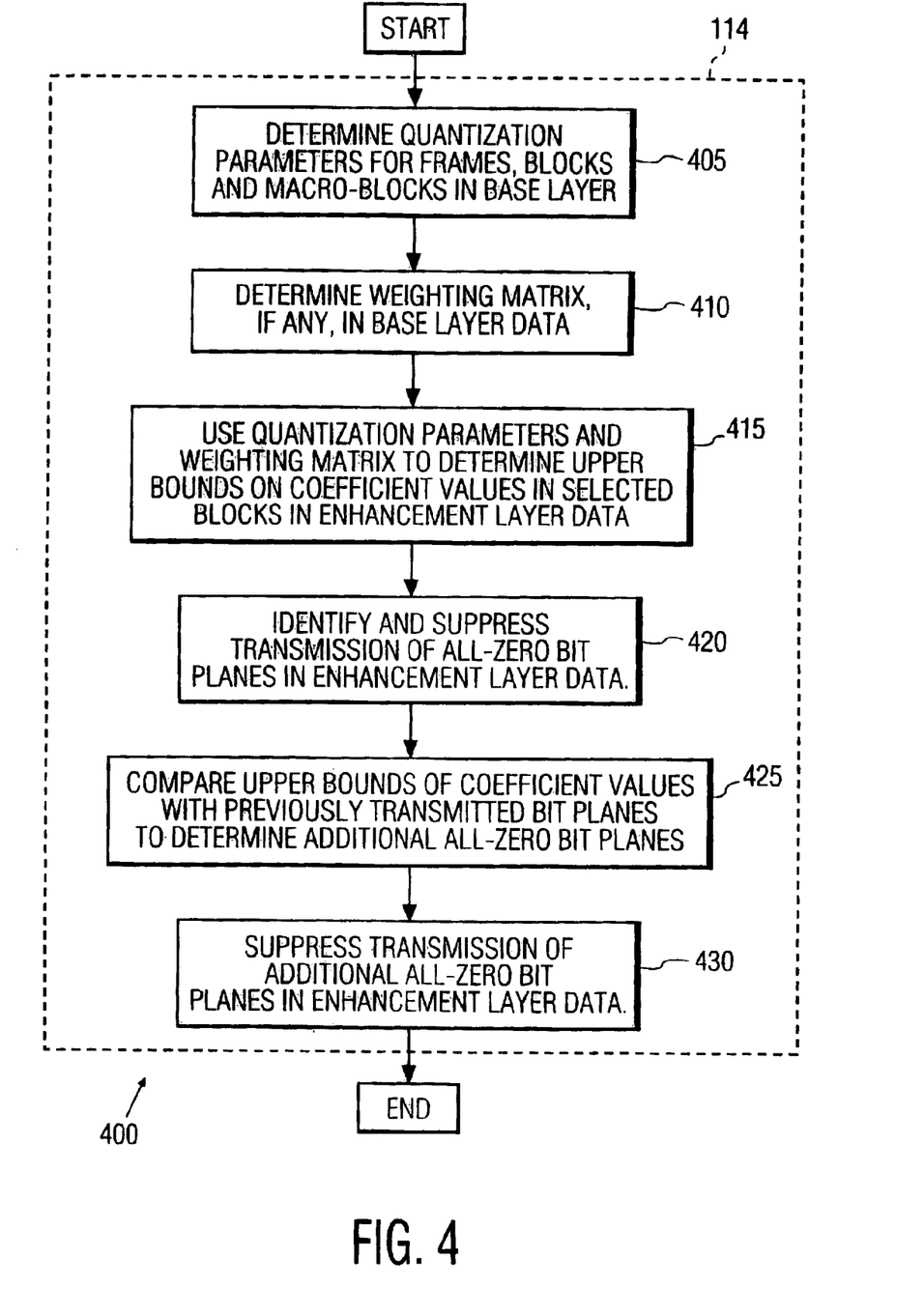
FIG. 4 is a flow diagram illustrating the operation of an exemplary video encoder in accordance with one embodiment of the present invention.

FIG. 4 is a flow diagram illustrating the operation of exemplary video encoder 114 in accordance with one embodiment of the present invention. As shown by FIG. 2, video encoder 114 determines quantization parameters (QPs) for the frames, blocks, and/or macro-blocks in the base layer video frames and outputs these from quantization circuit 216 (step 405). Depending upon whether MPEG-quantization type is used, video encoder 114 may apply a weighting matrix to quantize the various DCT coefficients at the base-layer on a frequency-adaptive fashion (step 410).

Video encoder 114 uses the QP data and weighting matrix, if present, to determine the upper bounds on residue coefficient values in selected blocks of the enhancement layer data (step 415). To illustrate the upper boundary determination, consider the residue (res(i)) associated with the (DCT) transformed coefficients at the base-layer for the non-intra case (i.e., B and P-Macro-blocks) and QP H263:

$res(i) < 2.5QP-1$ $Ubound(i) = 2.5QP-1$

Similar upper boundaries can be determined for a different quantization rule (i.e., qcoeff determination) or another transform (e.g., wavelet). The lower bound for res(i) is always zero.

If adaptive quantization plus frequency dependent weighting is used, QP in the previous equations may be substituted with $[(QP)W(i)]/16$, where $W(i)$ is frequency dependent weighting, which varies per transformed coefficient. The upper bound for res[i] becomes $[[2.5(QP)W(i)]/16]-1$, when frequency dependent weighting is used.

Continuing with the flow diagram, FGS frame encoder 256 analyzes the outputs from quantization circuit 216 and residual calculator 252 to determine the presence of all-zero planes in the enhancement layer data. FGS frame encoder 256 then suppresses transmission of data related to the all-zero planes so that only bit planes which can not be predicted as all-zero data are transmitted as part of the enhancement layer bit stream (step 420).

Next, FGS frame encoder 256 may compare the upper bounds of the residual transform coefficients with previously transmitted bit planes to determine the presence of all-zero planes in bit planes that are still to be transmitted (step 425). FGS frame encoder 256 uses this information to suppress transmission of the additional all-zero bit planes in the enhancement layer bit stream (step 430). For example, assume that the upper boundary for a DCT coefficient block is 26. Then the bit planes remaining to be transmitted cannot exceed the binary value "11010" (i.e., 26 decimal). If the first two bit planes have been transmitted and both were equal to "1", then the next bit plane must be an all zero bit plane, or else the upper boundary will be exceeded (i.e., binary "111xx" is greater than 26). Thus, video encoder 114 and video decoder 134 may represent a certain bit-plane p of the coefficient "coeff(_)" with a minimum number of bit-planes n and an upper bound UB. Thus, the bit-plane p can be predicted by both video encoder 114 and video decoder 134 if and only if:

$coeff(n-p)+2^p > UB$ and $n \geq p \geq 0$, where n=number of significant bit-planes and coeff(n-p)= the integer formed by using the first (already transmitted) n-p bit-planes.

Figure 5:
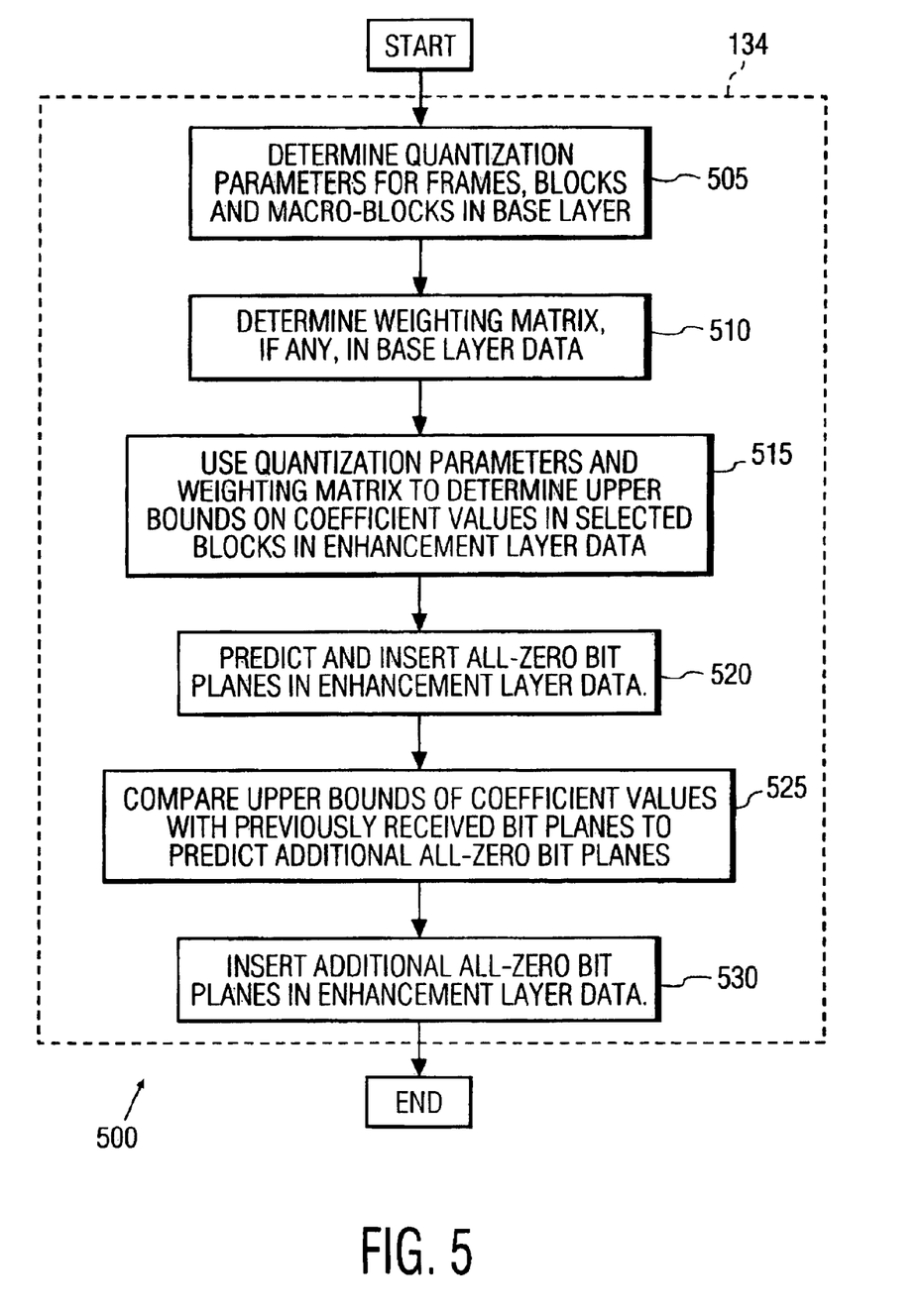
FIG. 5 is a flow diagram illustrating the operation of an exemplary video decoder in accordance with one embodiment of the present invention.

FIG. 5 is a flow diagram illustrating the operation of exemplary video decoder 134 in accordance with one embodiment of the present invention. Initially, entropy decoding circuit 312 receives the base layer bit stream from decoder buffer 132 and extracts QP information for the frames, blocks, and macro-blocks in the base layer (step 505). In addition, entropy decoding circuit 312 examines the base layer bit stream and extracts weighting factors that may have been applied (step 510). The weighting factors, if any, and the QP information are transferred to FGS frame decoding unit 352.

FGS frame decoding circuit 352 uses the QP information and the weighting matrix, if present, to calculate the upper bounds on individual coefficient values for specific image blocks (step 515). FGS frame decoding circuit 352 uses the upper bounds of the coefficient values to predict the presence and location of all-zero planes and to subsequently insert the all-zero bit planes (which were deleted by video encoder 114) into the enhancement layer data (step 520). Next, FGS frame decoding circuit 352 compares the upper bounds of coefficient values with the previously received and decoded bit planes to predict additional all-zero bit planes in the rest of the incoming enhancement layer bit stream (step 525). FGS frame encoding circuit 352 then reinserts the missing bit planes in the enhancement layer data for subsequent processing by inverse transform circuit 354 and residual computation circuit 356 (step 530).

Although the present invention has been described in detail, those skilled in the art should understand that they can make various changes, substitutions and alterations herein without departing from the spirit and scope of the invention in its broadest form.

What is claimed is:

1. A video decoder comprising:
    base layer circuitry capable of receiving compressed base layer video data; and
    enhancement layer circuitry capable of receiving enhancement layer video data associated with said compressed base layer video data; and
    a controller associated with said enhancement layer circuitry capable of receiving a quantization parameter associated with said compressed base layer video data and predicting therefrom at least one all-zero bit plane associated with at least one block of said enhancement layer video data, wherein said controller is capable of inserting said at least one all-zero bit plane into said enhancement layer video data,
    wherein said controller is capable of determining a second all-zero bit plane associated with said at least one block of said enhancement layer video data, based on an upper bound of said at least one block and a value of at least one previously received bit plane associated with said at least one block, wherein said controller is capable of inserting said second all-zero bit plane into said enhancement layer video data.

2. The video decoder set forth in claim 1 wherein said quantization parameter is associated with a frame of said base layer video data.

3. The video decoder set forth in claim 2 wherein said controller determines an upper boundary of a quantization parameter associated with said at least one block.

4. The video decoder set forth in claim 1 wherein said controller is further capable of receiving a weighting matrix associated with said base-layer video data and determining said at least one all-zero bit plane as a function of said quantization parameter and said weighting matrix.

5. For use in a video decoder comprising 1) base layer circuitry capable of receiving compressed base layer video data, and 2) enhancement layer circuitry capable of receiving enhancement layer video data associated with the compressed base layer video data, a method of operating a controller to decode the enhancement layer video data, the method comprising the steps of:
    receiving a quantization parameter associated with the compressed base layer video data;
    predicting therefrom at least one all-zero bit plane associated with at least one block of the enhancement layer video data;
    inserting the at least one all-zero bit plane into the enhancement layer video data;
    determining a second all-zero bit plane associated with the at least one block of the enhancement layer video data, based on an upper bound of the at least one block and a value of at least one previously received bit plane associated with the at least one block; and
    inserting the second all-zero bit plane into the enhancement layer video data.

6. The method set forth in claim 5 wherein the quantization parameter is associated with a frame of the base layer video data.

7. The method set forth in claim 6 including the further step of determining an upper boundary of a quantization parameter associated with the at least one block.

8. The method set forth in claim 5 including the further step of receiving a weighting matrix associated with the base-layer video data and determining the at least one all-zero bit plane as a function of the quantization parameter and the weighting matrix.

9. A television receiver comprising:
    a decoder buffer capable of receiving and storing compressed base layer video data and compressed enhancement layer video data;
    a video decoder coupled to said decoder buffer comprising:
    base layer circuitry capable of receiving said compressed base layer video data;
    enhancement layer circuitry capable of receiving said enhancement layer video data associated with said compressed base layer video data; and
    a controller associated with said enhancement layer circuitry capable of receiving a quantization parameter associated with said compressed base layer video data and predicting therefrom at least one all-zero bit plane associated with at least one block of said enhancement layer video data, wherein said controller is capable of inserting said at least one all-zero bit plane into said enhancement layer video data,
    wherein said controller is capable of determining a second all-zero bit plane associated with said at least one block of said enhancement layer video data, based on an upper bound of said at least one block and a value of at least one previously received bit plane associated with said at least one block, wherein said controller is capable of inserting said second all-zero bit plane into said enhancement layer video data.

10. The television receiver set forth in claim 9 wherein said quantization parameter is associated with a frame of said base layer video data.

11. The television receiver set forth in claim 10 wherein said controller determines an upper boundary of a quantization parameter associated with said at least one block.

12. The television receiver set forth in claim 9 wherein said controller is further capable of receiving a weighting matrix associated with said base-layer video data and determining said at least one all-zero bit plane as a function of said quantization parameter and said weighting matrix.

13. For use in a video processing system capable of receiving compressed base layer video data and enhancement layer video data associated with the compressed base layer video data, computer-executable process steps stored on a computer-readable storage medium for decoding the enhancement layer video data, the computer executable process steps comprising the steps of:
    receiving a quantization parameter associated with the compressed base layer video data;
    predicting therefrom at least one all-zero bit plane associated with at least one block of the enhancement layer video data;

inserting the at least one all-zero bit plane into the enhancement layer video data;

determining a second all-zero bit plane associated with the at least one block of the enhancement layer video data, based on an upper bound of the at least one block and a value of at least one previously received bit plane associated with the at least one block; and inserting the second all-zero bit plane into the enhancement layer video data.

14. The computer-executable process steps stored on a computer-readable storage medium set forth in claim 13 wherein the quantization parameter is associated with a frame of the base layer video data.

15. The computer-executable process steps stored on a computer-readable storage medium set forth in claim 14 including the further step of determining an upper boundary of a quantization parameter associated with the at least one block.

16. The computer-executable process steps stored on a computer-readable storage medium set forth in claim 13 including the further step of receiving a weighting matrix associated with the base-layer video data and determining the at least one all-zero bit plane as a function of the quantization parameter and the weighting matrix.

17. A video system comprising:

a television receiver comprising:

a decoder buffer capable of receiving and storing compressed base layer video data and compressed enhancement layer video data; and a video decoder coupled to said decoder buffer comprising:

base layer circuitry capable of receiving said compressed base layer video data;

enhancement layer circuitry capable of receiving said enhancement layer video data associated with said compressed base layer video data; and a controller associated with said enhancement layer circuitry capable of receiving a quantization parameter associated with said compressed base layer video data and predicting therefrom at least one all-zero bit plane associated with at least one block of said enhancement layer video data, wherein said controller is capable of inserting said at least one all-zero bit plane into said enhancement layer video data; and a video display coupled to said television receiver for displaying video images derived from said base layer video data and said enhancement layer video data containing said inserted all-zero bit plane, wherein said controller is capable of determining a second all-zero bit plane associated with said at least one block of said enhancement layer video data, based on an upper bound of said at least one block and a value of at least one previously received bit plane associated with said at least one block, wherein said controller is capable of inserting said second all-zero bit plane into said enhancement layer video data.

18. The video system set forth in claim 17 wherein said quantization parameter is associated with a frame of said base layer video data.

19. The video system set forth in claim 18 wherein said controller determines an upper boundary of a quantization parameter associated with said at least one block.

20. The video system set forth in claim 17 wherein said controller is further capable of receiving a weighting matrix associated with said base-layer video data and determining said at least one all-zero bit plane as a function of said quantization parameter and said weighting matrix.

* * * * *